July 9, 1963  R. L. HARTLEY  3,097,030
CLOSURE DOOR FOR A RECEPTACLE
Filed Aug. 15, 1960

INVENTOR.
ROBERT L. HARTLEY
BY *Harry E. Downer*
*Merrill N. Johnson*
Attorneys ical section central portion.

United States Patent Office 3,097,030
Patented July 9, 1963

3,097,030
CLOSURE DOOR FOR A RECEPTACLE
Robert L. Hartley, Indianapolis, Ind., assignor to Harper J. Ransburg Co., Inc., Indianapolis, Ind., a corporation of Indiana
Filed Aug. 15, 1960, Ser. No. 49,605
5 Claims. (Cl. 312—315)

This invention relates to improvements in a receptacle such as a bread box and more particularly to a bread box with a door of improved construction.

It is an object of this invention to provide a bread box with a door of improved simple construction which is quickly and conveniently assembled and attached to the bread box and which when in open horizontal position may serve as a cutting surface for bread, cake, etc.

This invention possesses other objects, features and advantages, some of which, with the foregoing, will be set forth in the following description of my invention, together with the accompanying drawing, in which.

In the preferred form of the invention there is provided a bread box with an improved door which may be attached to the lower base portion of the bread box by suitable means such as hinges. The door comprises an outer section which may be made of thin sheet metal and an inner section or liner which may be made of plastic material such as high impact polystyrene. The outer section comprises a central portion and a flange at its periphery. The outer section flange is provided with a locking means adjacent its outer extremity which may take the form of a curl. The inner section comprises a central portion and a flange at its periphery. The inner section flange is provided with a recess in its outer wall rearwardly of its outer extremity. The inner and outer sections are of such relative dimension and their respective flanges are so shaped and are sufficiently resilient relative to each other that upon being snapped into engagement with each other the locking means on the flange of the outer section engages the recess in the outer wall of the inner section flange for interlocking the inner and outer sections.

While a preferred form of the invention is illustrated and will be described in detail, it will be understood that various changes and modifications in construction may be made without departing from the scope and spirit of the invention which is defined in the attached claims.

Figure 1:
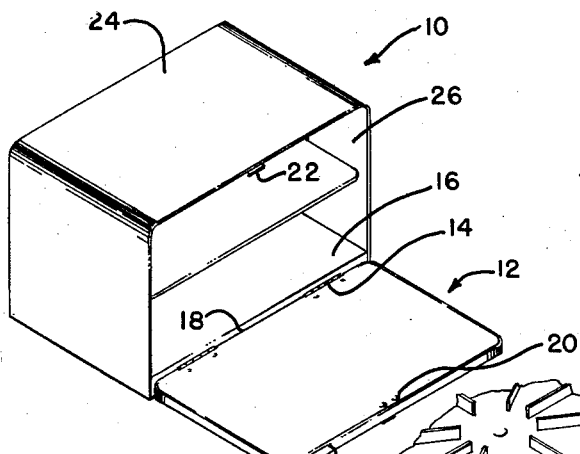
FIG. 1 is an isometric view of a bread box with the door in an open position.
Figure 2:
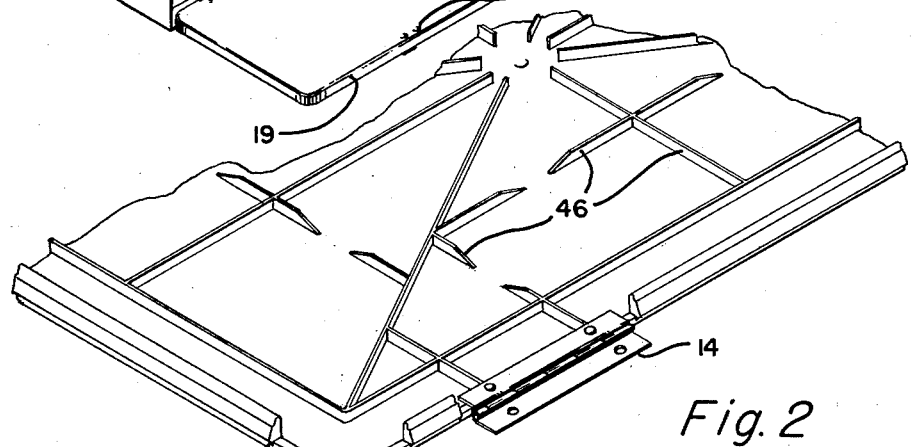
FIG. 2 is a partial enlarged view of the door liner in inverted position showing the ribbed side which fits against the metal section of the door.
Figure 3:
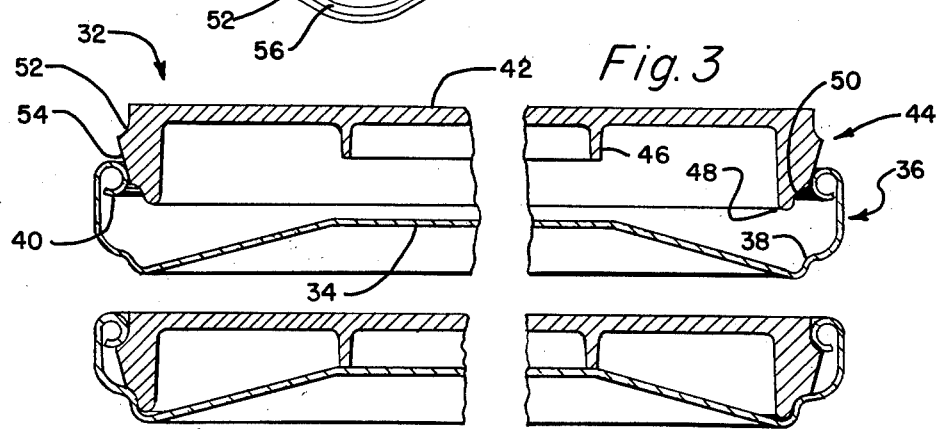
FIG. 3 shows a broken cross sectional view of the two sections of the door before they are snapped into assembled interlocking relationship.
Figure 4:
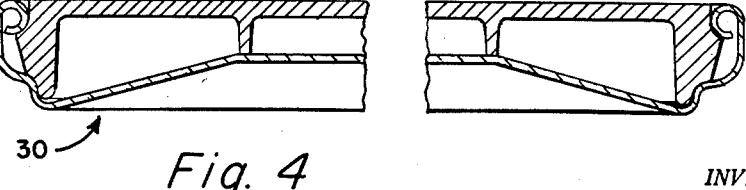
FIG. 4 shows the same broken cross sectional view of the two sections of the door after they are snapped into assembled interlocking relationship.

Referring to the drawing and more particularly to FIG. 1, there is shown a bread box 10 with a door 12 generally of rectangular shape. The door is affixed to the bread box by means of a pair of hinges 14 which are attached to the lower base member 16 of the bread box and to the door at edge 18. At the upper edge 19 of the door there is provided a knob (not shown) which is affixed to the door by means of rivets 20 made of steel or other magnetic material. A magnetic latch 22 is affixed to the top 24 of the bread box just inside opening 26. When the door 12 is moved toward its closed position the rivets 20 approach the magnetic latch 22, magnetic force attracts the rivets to the latch and holds the door closed.

The door 12 comprises an outer section 30 which is preferably made of thin plating quality sheet steel .025 inch thick and an inner section or liner 32 which is preferably made of high impact polystyrene.

The outer section 30 comprises a central dished portion 34 and a flange 36 at its periphery. The flange 36 is provided with a shoulder 38 near its inner extremity and a locking means 40 in the form of a curl at or adjacent its outer extremity.

The flange 36 is notched at spaced intervals along the lower longitudinal edge of the outer section 30 to permit fitting and connecting the hinges between the liner 32 and the lower base member 16 of the bread box.

The liner 32 comprises a central portion 42 and a flange 44 at its periphery. The exposed surface of the liner 32 has a gloss finish which absorbs a minimum of moisture and which is adapted to be used as a bread board. The inner surface of the liner 32 is provided with ribs 46 which are of a sufficient elevation to engage the metal section 30 when the liner 32 is pressed in assembled position with the outer section 30 to add stiffness and rigidity to the door 12. The flange 44 is provided with a pilot 48 at its outer extremity, a seat 50 adjacent the pilot 48, and a recess 52 near the inner extremity of the flange 44. The outer wall of the flange 44 between the seat 50 and the recess 52 is sloped outwardly as shown in 54.

The flange 44 is notched at the corners of the liner 32 as indicated at 56 to permit easier flexing of the flange 44 resulting in greater facility in pressing the liner 32 in assembled position with the outer section 30. The flange 44 is also notched at spaced intervals along the lower longitudinal edge of the liner 32 to permit attaching the hinges 14 to the liner.

The outer section 30 and the liner 32 are so dimensioned, and at least one or the other of the flanges 36 or 44 are sufficiently resilient that upon the liner 32 being pressed inwardly within the confines of the flange 36 one or both of the flanges 36 and 44 flex as the curl 40 slides along the sloping outer wall 54 until it comes into engagement with the recess 52. In this condition the outer section 30 and the liner 32 are interlocked in assembled position.

While it is understood that detailed specifications for a bread box to be made in accordance with the invention may vary depending upon particular requirements, by way of example, one bread box made in accordance with this invention employed the following specifications. The outer section 30 was 16.25 inches in length and 9.875 inches in width. The elevation of the flange 36 was .422 inch. The diameter of the curl 40 was .125 inch. The liner 32 was 16.087 inches in length and 9.087 inches in width. The elevation of the flange 44 was .389 inch. The recess 52 was cut inwardly .035 inch. The outer wall 54 was sloped 15° from the vertical. The thickness of the central portion of the liner 32 was .06 inch and the ribs extended upwardly .129 inch.

While in the foregoing the preferred embodiment of the invention has been described and shown, it is understood that alterations and modifications may be made thereto provided the said alterations and modifications fall within the scope of the appended claims.

I claim:

1. A bread box door comprising a metal section having a central dished portion and a peripheral flange terminating in a curl at its free edge and having a shoulder adjacent its attached edge, said metal flange having sufficient resiliency whereby upon being moved outwardly it will have a tendency to return to its normal position; a liner of plastic material having a central portion and a peripheral flange; a seat on the outer face of said liner flange adjacent its free edge; a recess on the outer face of said liner flange adjacent its attached edge; a plurality of ribs extending from said liner central section in the same direction as said liner flange, said ribs being adapted to engage said metal central portion; said metal section and said liner being so dimensioned that upon said liner being snapped inside said metal flange, said metal flange shoulder rests on said liner flange seat, said curl lockingly engages said liner flange recess to hold such liner locked within said metal section, and said ribs engage the inner surface of said metal central portion.

2. A bread box door comprising a metal section having a central portion and a flange at its periphery, said metal flange having sufficient resiliency whereby upon being moved outwardly it will have a tendency to return to its normal position; locking means adjacent to the free edge of said metal flange projecting inwardly therefrom; a liner having a central portion and a flange at its periphery; a recess in the outer face of said liner flange adjacent its attached edge; a plurality of ribs extending outwardly from said liner central portion and being adapted to engage said metal central portion; said liner having a maximum lateral extent at a point intermediate the free and attached edges of its flange greater than the minimum lateral extent of said metal section whereby upon insertion of the liner into said metal section said metal flange will be first sprung outwardly by the flange on said liner and then snapped inwardly with said locking means lockingly engaging said recess.

3. A door for a receptacle comprising an outer section having a central portion and an outer flange at its periphery, at least said outer flange being made of resilient material; locking means adjacent the free edge of said outer flange and a shoulder adjacent the attached edge of said outer flange; and an inner section having a central portion and an inner flange at its periphery, said inner flange having a recess in its outer face adjacent its attached edge and a seat adjacent its free edge; said inner and outer sections being so dimensioned that upon being snapped into engagement with each other said locking means engages said recess and said sheet engages said shoulder for interlocking said inner and outer sections.

4. A bread box door comprising an outer section having a central portion and a first flange at its periphery generally normal to the plane of said central portion, at least said first flange being made of resilient material; locking means adjacent the free edge of said first flange; and an inner section having a central portion and a second flange at its periphery, said second flange having a recess in its outer face and having its outer face angled inwardly from said recess toward its free edge; said inner and outer sections being so dimensioned that upon said inner section being placed within the confines of said first flange and being pressed inwardly said locking means slides along said angled outer face of said second flange until it comes into engagement with said recess and interlocks said inner and outer sections.

5. In a bread box of generally prismatic shape having an opening on one side, a door for the bread box comprising an outer section having a central portion and an inwardly extending first flange at its periphery, at least said first flange being made of resilient material, locking means adjacent the free edge of said first flange, an inner plastic section having a central portion and an outwardly extending second flange at its periphery, said central portion being made of suitable material for use as a bread board and said second flange having a first recess in its outer face adjacent its attached edge, hinge means having one of their ends carried in second recesses formed in said second flange and interposed between said outer and inner sections and connected to said inner section adjacent its lower edge and having their opposed ends connected to the bread box, said inner and outer sections being so dimensioned that upon being snapped into engagement with each other said locking means engages said first recess for interlocking said inner and outer sections, said door upon being connected to the bread box being adapted to be moved to close the opening in the bread box and to be moved to a horizontal postion for use as a bread board.

References Cited in the file of this patent
UNITED STATES PATENTS

| | | |
|---|---|---|
| D. 161,771 | Lumley | Jan. 30, 1951 |
| 1,905,853 | Griffiths | Apr. 25, 1933 |
| 2,036,781 | Steenstrup | Apr. 7, 1936 |
| 2,091,791 | Newman | Aug. 31, 1937 |
| 2,556,099 | Myer | June 5, 1951 |
| 2,579,157 | Price et al. | Dec. 18, 1951 |
| 2,708,294 | Saunders | May 17, 1955 |
| 2,881,482 | Hiers | Apr. 14, 1959 |